(12) United States Patent
Chang et al.

(10) Patent No.: US 9,642,484 B2
(45) Date of Patent: May 9, 2017

(54) DINNERWARE WITH MULTIFUNCTIONAL CONFIGURATIONS

(71) Applicants: Fu-Nan Chang, Taoyuan (TW); Hsueh-Chieh Chu, New Taipei (TW)

(72) Inventors: Fu-Nan Chang, Taoyuan (TW); Hsueh-Chieh Chu, New Taipei (TW)

(*) Notice: Subject to any disclaimer, the term of this patent is extended or adjusted under 35 U.S.C. 154(b) by 34 days.

(21) Appl. No.: 14/152,383

(22) Filed: Jan. 10, 2014

(65) Prior Publication Data

US 2015/0196150 A1 Jul. 16, 2015

(51) Int. Cl.
| A47J 43/28 | (2006.01) |
| A47G 21/06 | (2006.01) |
| A46B 15/00 | (2006.01) |
| A47G 21/02 | (2006.01) |
| A47G 21/18 | (2006.01) |

(52) U.S. Cl.
CPC .............. *A47G 21/06* (2013.01); *A46B 15/00* (2013.01); *A47G 21/02* (2013.01); *A47G 21/103* (2013.01); *A47G 21/18* (2013.01); *A47J 43/288* (2013.01)

(58) Field of Classification Search
CPC ...................................................... A47G 21/06
See application file for complete search history.

(56) References Cited

U.S. PATENT DOCUMENTS

| 1,030,756 | A | * | 6/1912 | Yakligian | ................ | B26B 11/00 |
| | | | | | | 30/143 |
| 5,197,623 | A | * | 3/1993 | Wang | ................... | B65D 51/246 |
| | | | | | | 206/542 |
| 6,957,492 | B1 | * | 10/2005 | Westfall | ................ | A47J 43/288 |
| | | | | | | 30/143 |
| 7,093,868 | B1 | * | 8/2006 | Shen | ..................... | A47G 21/103 |
| | | | | | | 294/218 |
| 7,571,943 | B1 | * | 8/2009 | Lee | ....................... | A47G 21/103 |
| | | | | | | 294/218 |
| 7,856,722 | B2 | * | 12/2010 | Lago-Arenas | ......... | A47G 21/06 |
| | | | | | | 30/142 |
| 2009/0026782 | A1 | * | 1/2009 | Lion | .................... | A47G 21/181 |
| | | | | | | 294/99.2 |
| 2012/0068487 | A1 | * | 3/2012 | Wong | ................... | A47G 21/103 |
| | | | | | | 294/218 |
| 2015/0190004 | A1 | * | 7/2015 | Chang | ................ | A46B 15/0067 |
| | | | | | | 239/33 |
| 2015/0196150 | A1 | * | 7/2015 | Chang | .................... | A47G 21/06 |
| | | | | | | 30/122 |

FOREIGN PATENT DOCUMENTS

| FR | 467 828 | * | 6/1914 |
| FR | 2 698 772 | * | 6/1994 |
| GB | 20 242 | * | 0/1914 |

* cited by examiner

*Primary Examiner* — Hwei C Payer
(74) *Attorney, Agent, or Firm* — Egbert Law Offices, PLLC (57) ABSTRACT

A dinnerware apparatus has an elongated solid storage tube having a through hole therein, a flexible cleaning brush retractably positioned in the through hole of the storage tube, and a connector affixed to an end of the brush holder. The flexible cleaning brush has an elongated flexible brush holder and a brushing portion affixed to an end of the brush holder. The connector has a service end and a mating end. The service end has a shape of a knife, fork, spoon, or a chopstick head. The mating end has a tight limiting section embedded at one end of the storage tube.

6 Claims, 9 Drawing Sheets

FIG.11

DINNERWARE WITH MULTIFUNCTIONAL CONFIGURATIONS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to dinnerware, and more particularly to innovative dinnerware which is designed into a tubular pattern with multifunctional configurations.

2. Description of Related Art Including Information Disclosed Under 37 CFR 1.97 and 37 CFR 1.98.

Various kinds of dinnerware used in human life. For example, pipettes, or drinking straws, are often used by inserting a straw into a beverage for having a drink when users purchase a packaged beverage or drink.

Yet, serious safety and hygiene problems are hidden in the currently available pipette products because common pipettes are made of plastics. While people have a drink via the pipette, the plastic pipette may release toxic plasticizers ingredients in case of overheating of the drink. As for an acidic drink, the plastic pipette may also release its toxicity due to corrosion and dissolution, especially for vegetable and fruit stores where most beverages contain acid-rich ingredients. So, there is a higher probability of toxic dissolution in the utilization of plastic pipettes. Moreover, heavy metals endangering the human health are often proved to be contained in the pipette fitted with colorful patterns. While people often consume such plastic pipettes in their everyday life, toxic substances may also be absorbed unconsciously. In spite of the tiny toxicity contained therein, frequent utilization of such pipette probably yields negative influence on and great harm against the human health. In addition, the disposable plastic pipette will generate a lot of waste, and in fact recycling is very difficult due to small size and residual dirt, leading to environmental problems that shall raise great concern of the general public.

At present, the common pipette is generally made of plastic materials owing to the fact that the pipette is always deemed as a disposable and cheap product. So, mass production is made possible for sanitary chopsticks and plastic spoons. Yet, with the improvement of the general public's environmental consciousness and continuous coverage of food security and hygiene cases, more and more people realize that it is necessary to rectify their wrong habits, so many consumers intend to carry dinnerware. Therefore, more efforts shall be made to realize breakthrough progress for the pipette in response to the evitable trend in the future.

BRIEF SUMMARY OF THE INVENTION

Based on the unique design of the present invention wherein "a dinnerware with multifunctional configurations" mainly comprises a solid storage tube, flexible cleaning brush, dinnerware type connector and tight limiting section, the present invention could provide a dinnerware free of plasticizers ingredients. The present invention is characterized by reusability, excellent durability and simple structure. So, it can thoroughly resolve problems such as toxicity released by conventional plastic pipette and chopsticks, and poorer environmental-friendliness. Besides, due to simple structure, good flexibility and integrated functions, it can be carried conveniently by users to improve hygiene and food security with better applicability.

Although the invention has been explained in relation to its preferred embodiment, it is to be understood that many other possible modifications and variations can be made without departing from the spirit and scope of the invention as hereinafter claimed.

BRIEF DESCRIPTION OF THE SEVERAL VIEWS OF THE DRAWINGS

FIG. 4 is a plane view of the connector of the present invention.

DETAILED DESCRIPTION OF THE INVENTION

FIGS. 1-4 depict preferred embodiments of a dinnerware of the present invention with multifunctional configurations, which, however, are provided for only explanatory objective for patent claims.

The dinnerware 05 comprises at least a solid storage tube 10, designed into an extension tube (or a straight tube) made of stainless steel. A through hole 11 is formed inside said solid storage tube 10, and both ends of said solid storage tube 10 are flat. The outer diameter of the solid storage tube 10 is 5 mm-15 mm, so it can be fabricated into a thick or slim tube.

At least one flexible cleaning brush 20 is set into the through hole 11 of solid storage tube 10 in a retractable state. The flexible cleaning brush 20 comprises a flexible long brush holder 21 and a brushing portion 22 mated at one end of the long brush holder 21. The brushing portion 22 is used to clean the inner wall of through hole 11. As the dinnerware 05 of the present invention is intended for repeated utilization, it is very important to keep the through-hole 11 in a clean state, and the flexible cleaning brush 20 could easily resolve this problem.

Figure 1:
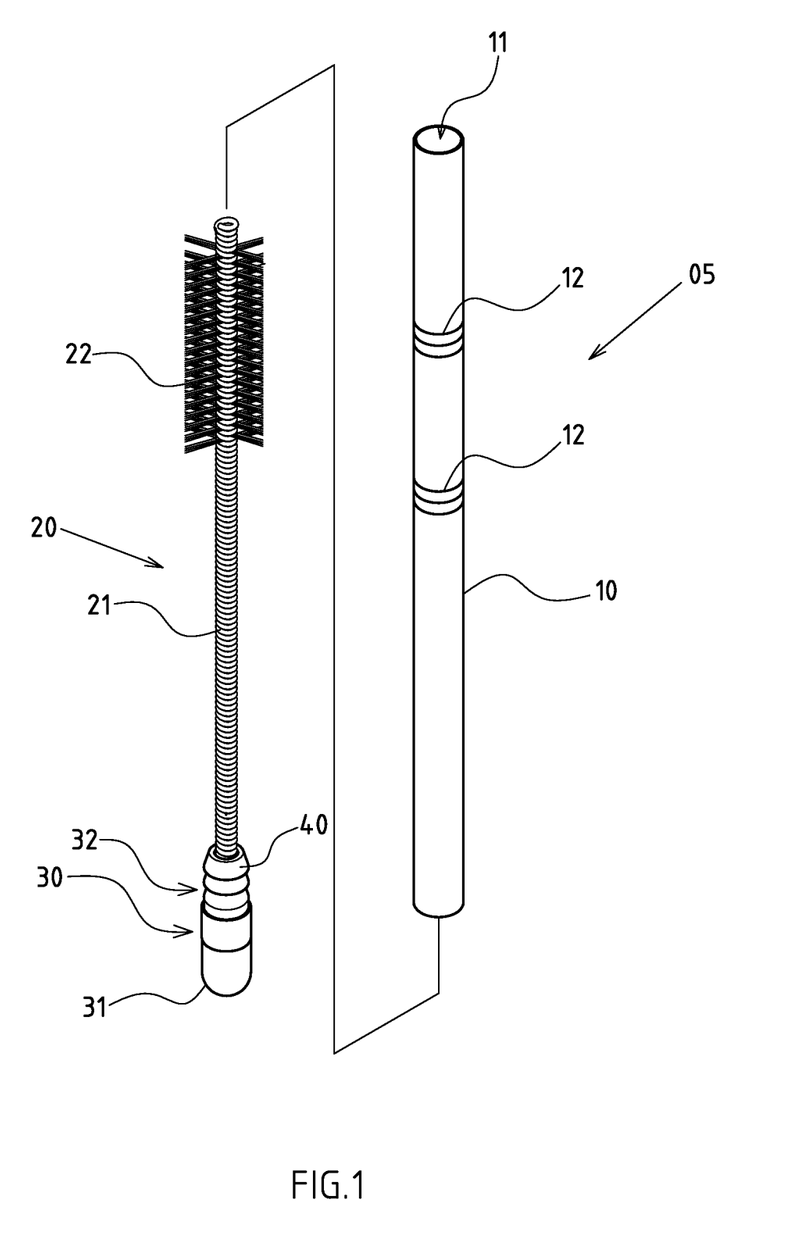
FIG. 1 is a perspective view of the preferred embodiment of the present invention.
Figure 2:
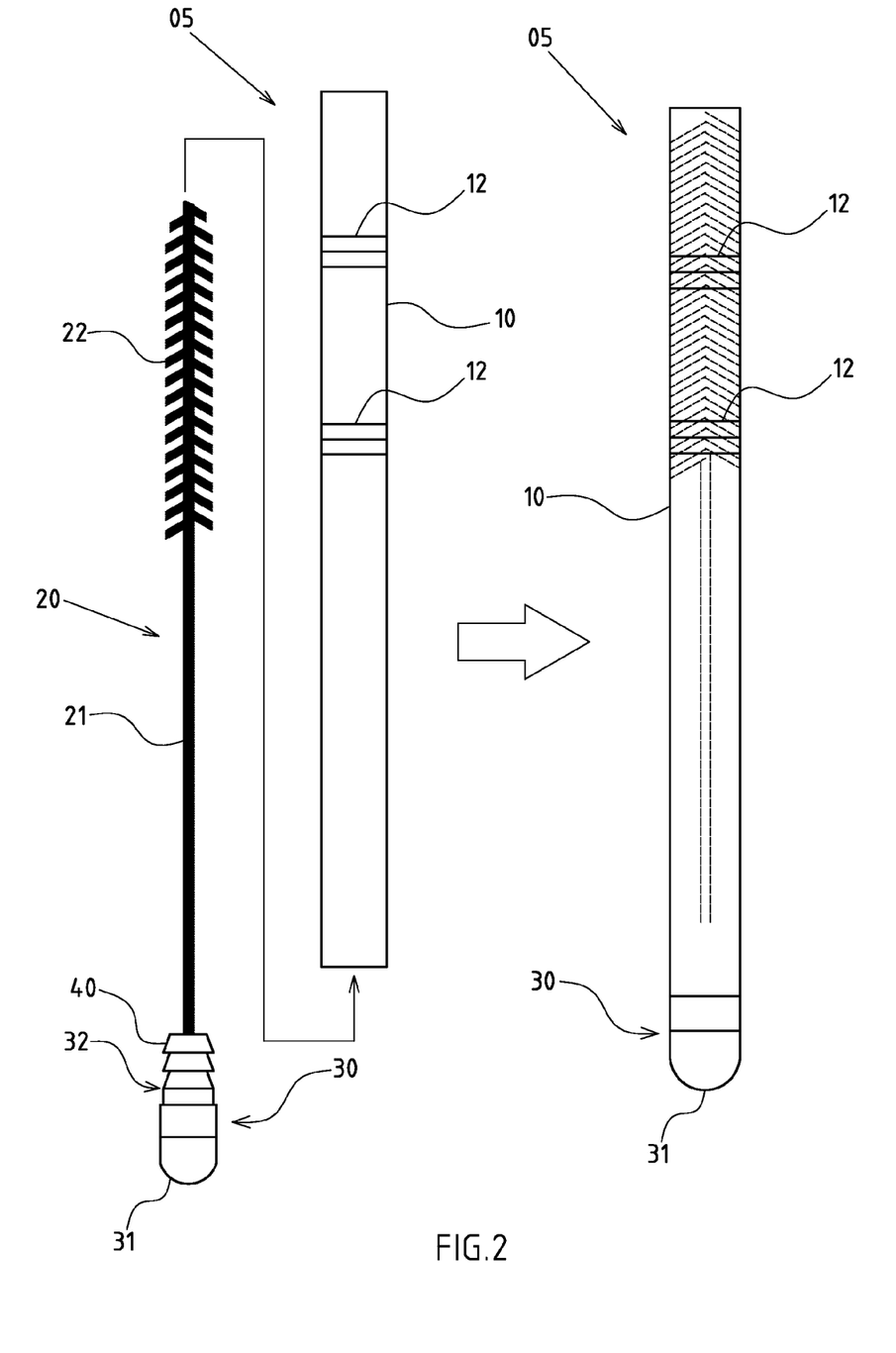
FIG. 2 is a plane view of the present invention wherein the flexible cleaning brush and solid storage tube are incorporated.
Figure 3:
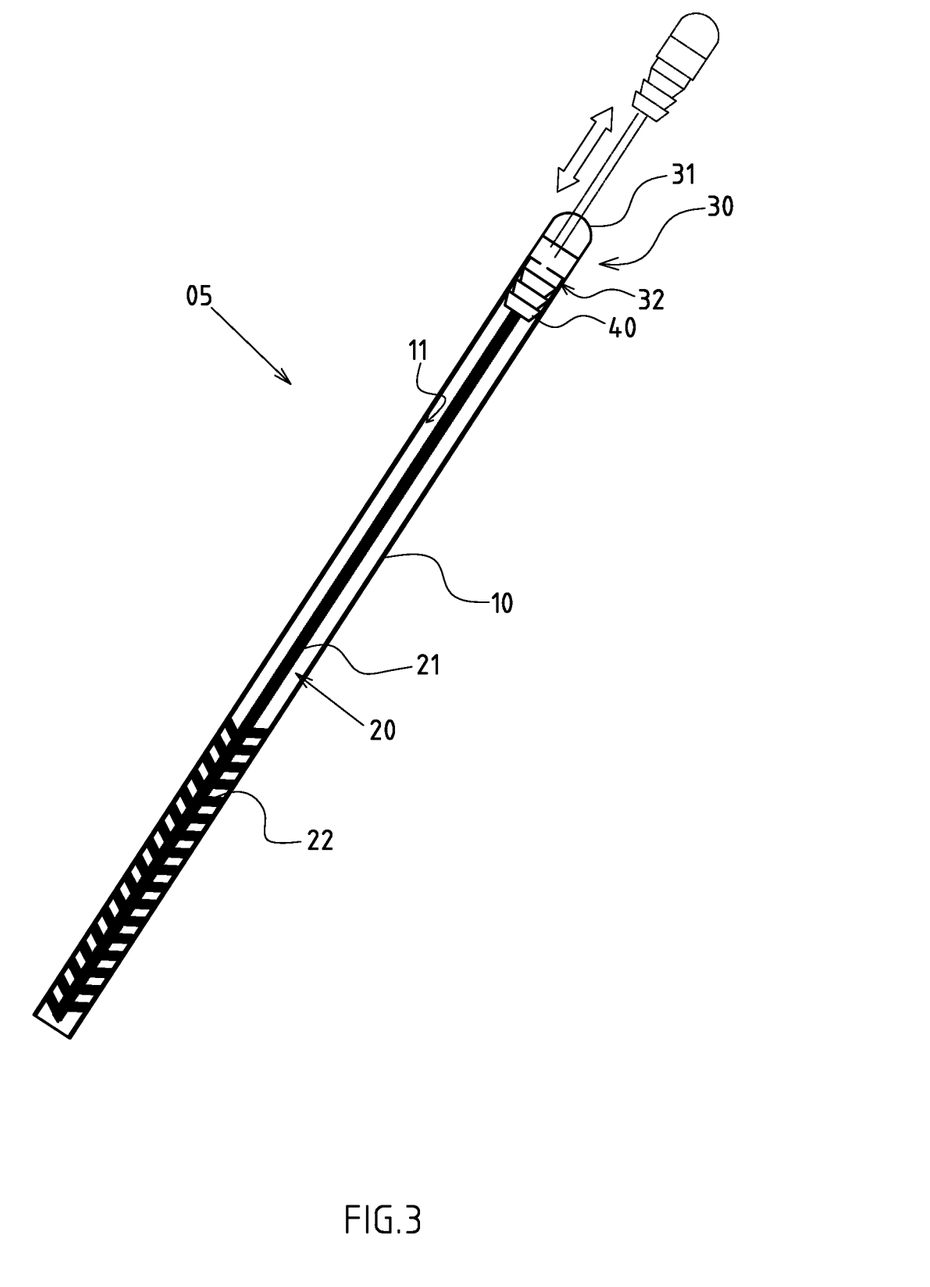
FIG. 3 is a plane schematic view of the present invention wherein the flexible cleaning brush could clean the through hole's inner wall via the brushing portion.
Figure 4:
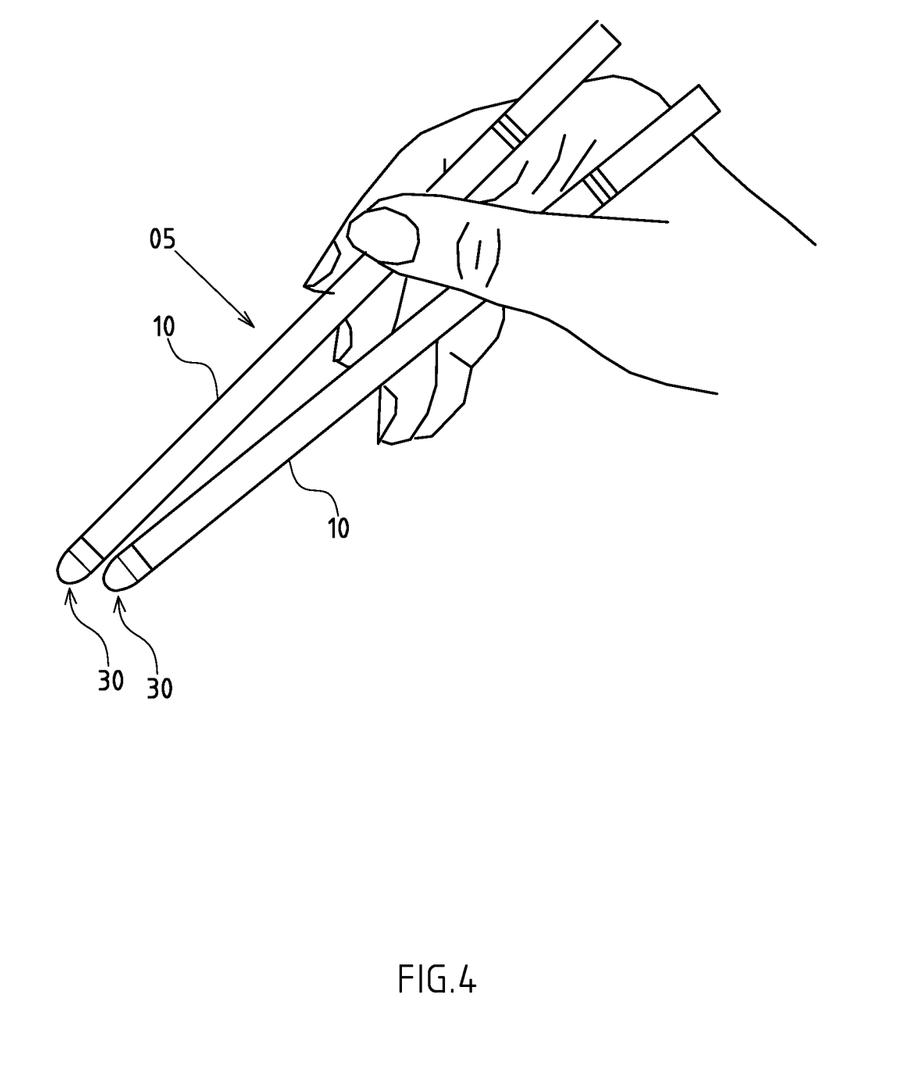
FIG. 4 is an application view of various dinnerware patterns of the present invention.
Figure 5:
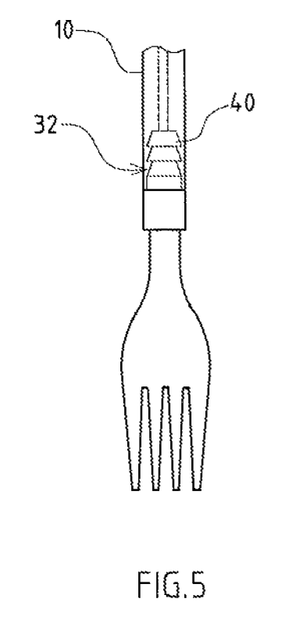
Figure 6:
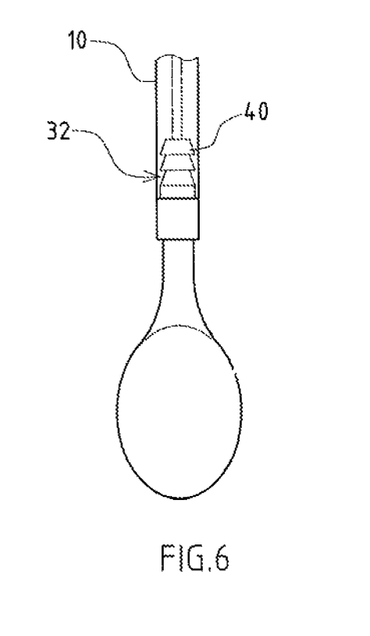
FIG. 6 is a plane view of another preferred embodiment of the connector of the present invention.
Figure 7:
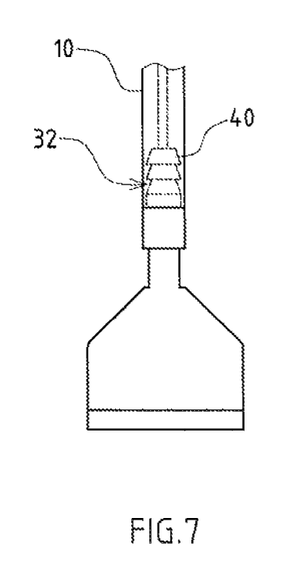
FIG. 7 is a plane view of another preferred embodiment of the connector of the present invention.
Figure 11:
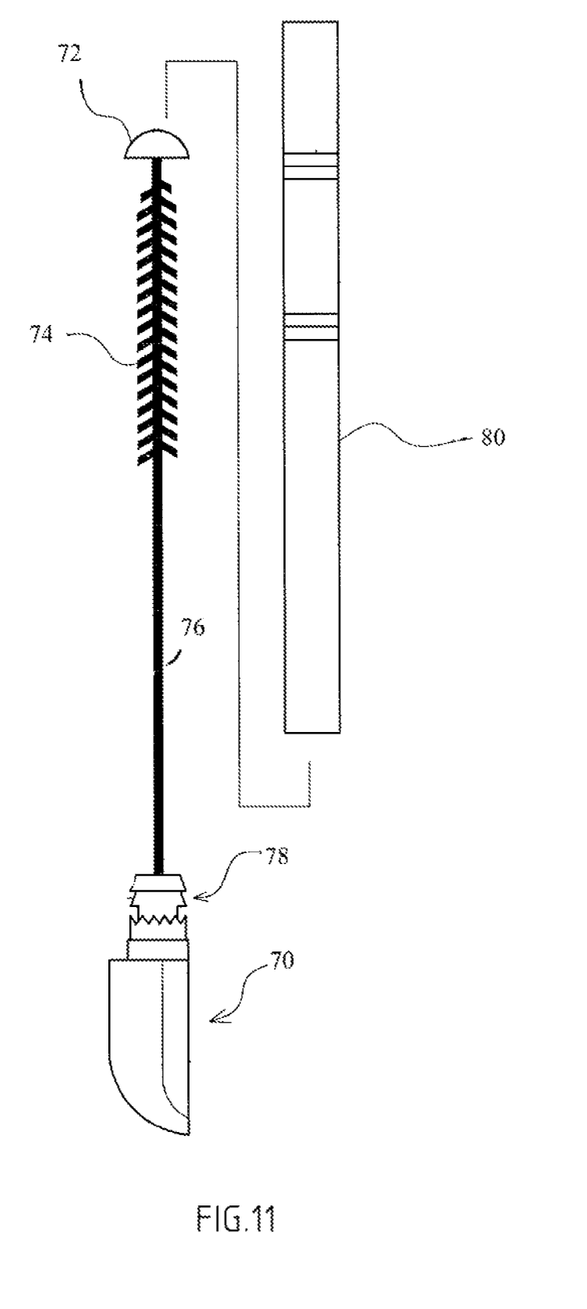
FIG. 11 is a plane view of another preferred embodiment of the present invention.

A dinnerware connector 30 is set at one end of the long brush holder 21 opposite to the brushing portion 22. The connector 30 comprises a service end 31 and a mating end 32, of which the service end 31 contains some patterns including either of a knife (as shown in FIG. 11), fork (as shown in FIG. 5), spoon (as shown in FIG. 6) or chopsticks head (as shown in FIGS. 2 and 4), or otherwise even a shovel (as shown in FIG. 7). When the flexible cleaning brush 20 is fully retracted into the solid storage tube 10, the mating end 32 of the connector 30 can be embedded into the outlet of the solid storage tube 10.

A tight limiting section 40 is formed externally at the mating end 32 of said connector 30. When said connector 30 is inserted into the end of solid storage tube 10, the tight limiting section 40 is applied for fixed limitation.

Based on above-specified structural design, when the flexible cleaning brush 20 is pulled out from the solid storage tube 10, the solid storage tube 10 can be used separately as a common drinking pipette by directly inserting into the drink cup. As used herein, the term "pipette" can mean a drinking straw. Even if the drink cup is sealed by adhesive film, the solid storage tube 10 with two flat ends allows the tube to easily penetrate the adhesive film due to excellent rigidity of the solid storage tube 10. Moreover, both ends of the solid storage tube 10 are designed flat to guarantee security against any hazard from chamfered openings of a conventional pipette; on the other hand, when the solid cleaning brush 20 is fully stretched into the through hole 11 of solid storage tube 10, the connector 30 can be embedded into the end of the solid storage tube 10 to form such dinnerware as knife, chopsticks, fork or soup spoon, making the solid storage tube 10 a drinking pipette or other dinnerware. FIG. 4 depicts the preferred embodiment of chopsticks in the present invention, which makes possible convenient use with environmental friendliness, structural simplicity and multifunctional advantages without safety and hygiene concerns.

Figure 8:
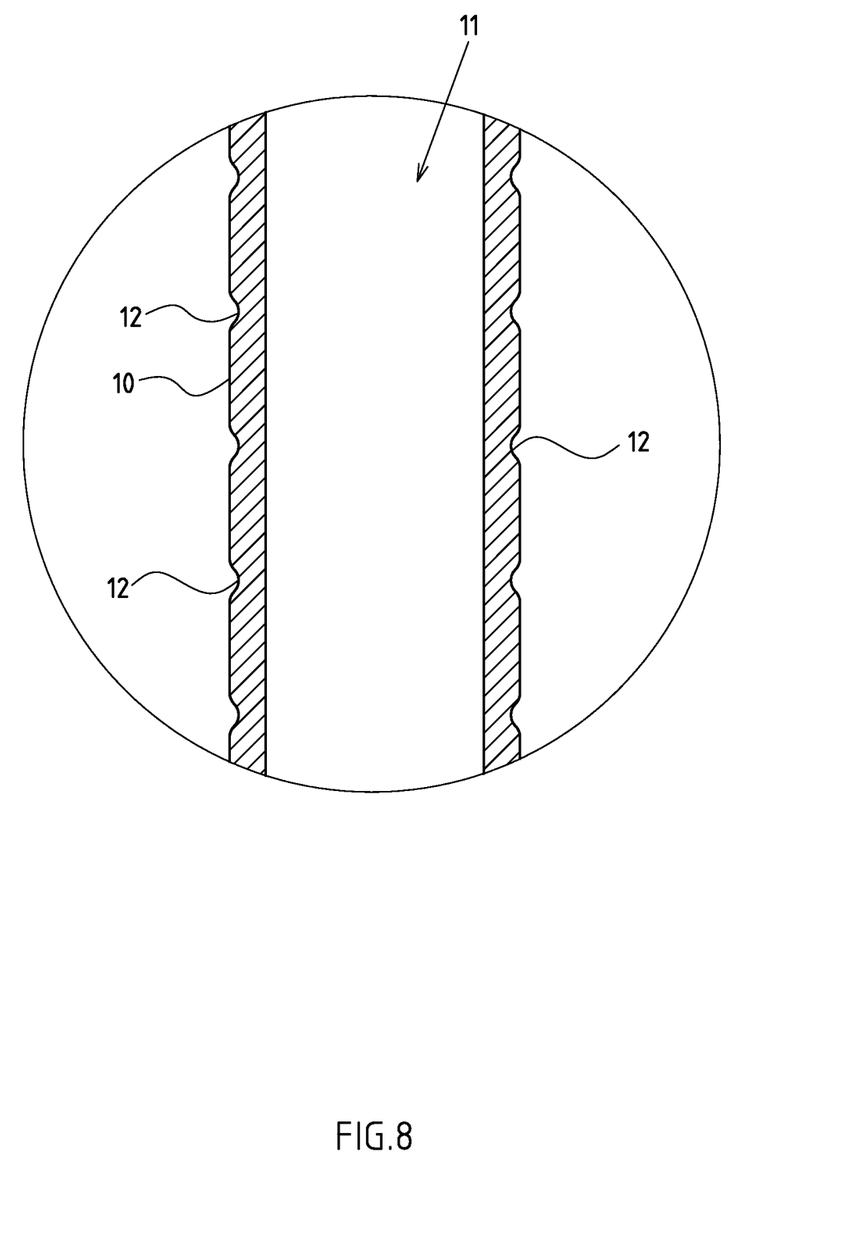
FIG. 8 is an application view of the present invention wherein circumferential skip lines are arranged on the circumferential sections of the solid storage body.

Referring to FIGS. 2 and 8, circumferential skip lines 12 are arranged at intervals on the circumferential sections of the solid storage body 10. In this preferred embodiment, the circumferential skip lines 12 are mainly used for resisting slippage at circumferential sections of the solid storage body 10, enabling the users to hold the solid storage body 10 firmly. Besides, the circumferential skip lines 12 could improve the aesthetical effect of the solid storage body 10.

Figure 9:
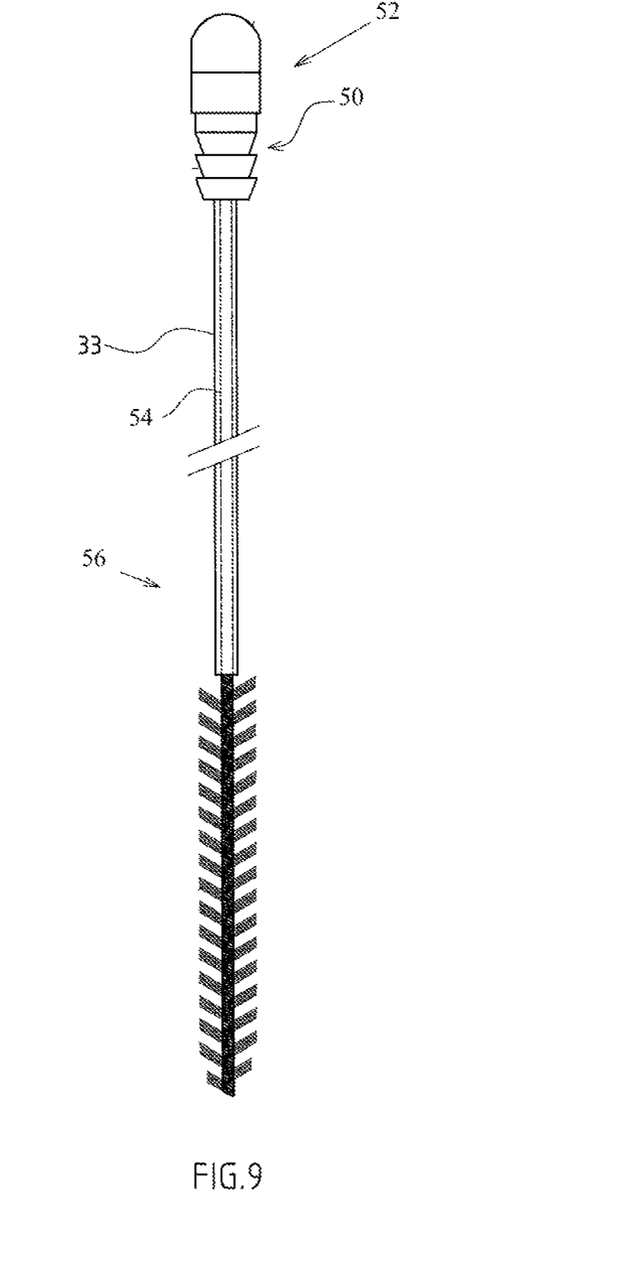
FIG. 9 is an application plane view of the present invention wherein the mating end of connector is stretched to form an extended covering portion.

Referring to FIG. 9, the mating end 50 of connector 52 can be stretched to form an extended covering portion 33, which can be extended to cover the flexible long brush holder 54 of the flexible cleaning brush 56 to prevent settlement of dirt in the flexible long brush holder 54 so as to prevent bacteria generation in through hole of the solid storage tube.

Figure 10:
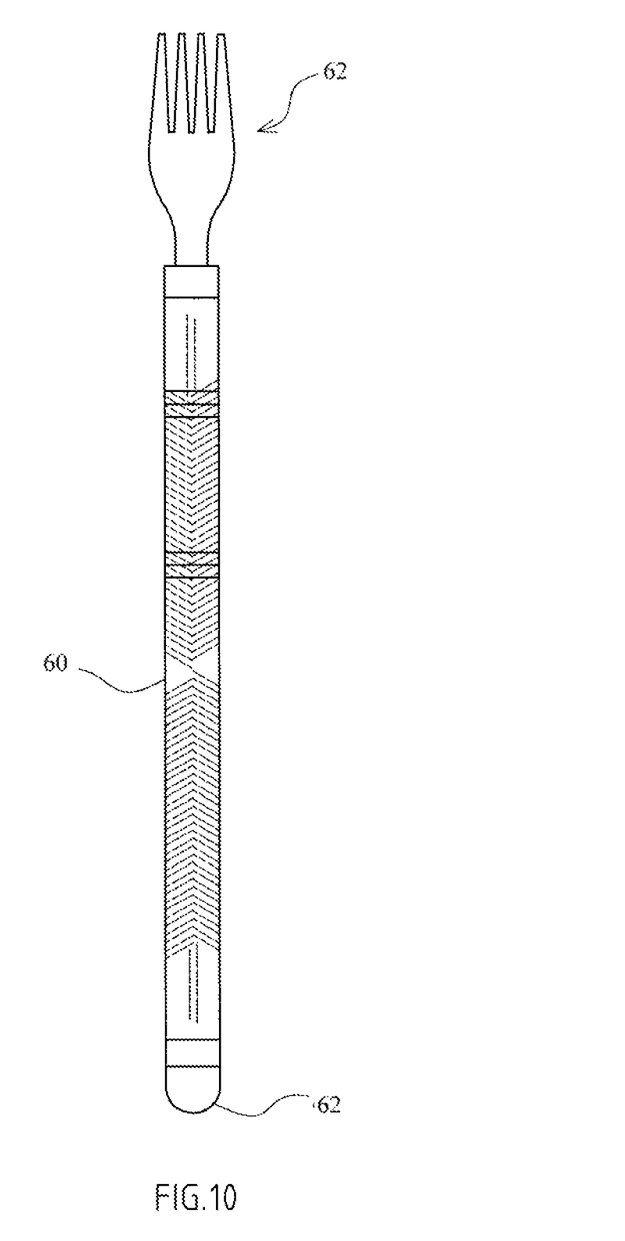
FIG. 10 is a plane view of another preferred embodiment of the present invention.

Referring to FIG. 10, two flexible cleaning brushes are inserted into through hole of solid storage tube 60; the connectors 62 of each flexible cleaning brush can be embedded separately into both ends of the solid storage tube 60 to accommodate the brushing portion into the through hole. Of which, the connectors 62 for the flexible cleaning brushes are of various dinnerware patterns, thereby improving greatly the flexibility and convenience.

Referring to FIG. 11, since connector 70 is of a knife pattern, a flexible clamping head 72 is set at one end of the brushing portion 74 of flexible long brush holder 76, while the mating end 78 of connector 70 is of a geared pattern to ensure compressive flexibility of the periphery of the mating end 78. Since the flexible long brush holder 76 is stretched into through hole of the solid storage tube 80, the geared mating end 78 can be abutted against the end of solid storage tube 80. By continuously pushing the flexible long brush holder 76, the periphery of the mating end 78 is compressed to be embedded into the solid storage tube 80, while the flexible clamping head 72 is protruded from the other end of solid storage tube 80 for positioning. When the flexible long brush holder 76 is used for cleaning the solid storage tube 80 back and forth, the geared mating end 78 can prevent the flexible long brush holder 76 from fully stretching into the solid storage tube 80, and also prevent the flexible clamping head 72 from protruding out the other end of solid storage tube 80 so as to maintain smooth flushing.

We claim:

1. A dinnerware apparatus comprising:
an elongated solid storage tube formed of stainless steel, said storage tube having a through hole therein, said storage tube having flat ends;
a flexible cleaning brush retractably positioned in the through hole of said storage tube, said flexible cleaning brush having an elongated flexible brush holder and a brushing portion affixed to an end of said brush holder, said brushing portion adapted to clean an inner wall of said storage tube;
a connector affixed to an opposite end of said brush holder, said connector having a service end and a mating end, said service end having a shape selected from the group consisting of a knife, fork, spoon and a chopstick head, said mating end of said connector having a tight limiting section embedded at one of said flat ends of said storage tube so as to have a portion extending outwardly of said one of said flat ends when said brushing portion of said cleaning brush is fully extended into said storage tube.

2. The dinnerware apparatus of claim 1, said mating end of said connector having an elongated covering portion extending so as to cover said brush holder of said flexible cleaning brush.

3. The dinnerware apparatus of claim 1, said flexible cleaning brush comprising a pair of flexible cleaning brushes.

4. The dinnerware apparatus of claim 1, said service end being of the knife shape, the dinnerware apparatus further comprising:
a clamping head affixed to one end of said brushing portion, said mating end being of a gear shape, said mating end abutting said one of said flat ends of said storage tube, said clamping head protruding outwardly of the other of said flat ends of said storage tube.

5. The dinnerware apparatus of claim 1, said storage tube having a plurality of skiplines arranged in spaced relation circumferentially around said storage tube.

6. The dinnerware apparatus of claim 1, said storage tube having an outer diameter of between 5 and 15 millimeters.

\* \* \* \* \*